United States Patent
De Simone et al.

(10) Patent No.: US 11,879,497 B2
(45) Date of Patent: Jan. 23, 2024

(54) MORPHABLE SHEET STRUCTURE

(71) Applicants: Universitat Politecnica De Catalunya, Barcelona (ES); Scuola Internazionale Superiore Di Studi Avanzati, Trieste (IT)

(72) Inventors: Antonio De Simone, Rome (IT); Giovanni Noselli, Bolzano (IT); Marino Arroyo Balaguer, Barcelona (ES)

(73) Assignees: UNIVERSITAT POLITECNICA DE CATALUNA, Barcelona (ES); SCUOLA INTERNAZIONALE SUPERIORE DI STUDI AVANZATI, Trieste (IT)

( * ) Notice: Subject to any disclaimer, the term of this patent is extended or adjusted under 35 U.S.C. 154(b) by 388 days.

(21) Appl. No.: 17/295,966

(22) PCT Filed: Nov. 19, 2019

(86) PCT No.: PCT/EP2019/081739
§ 371 (c)(1),
(2) Date: May 21, 2021

(87) PCT Pub. No.: WO2020/104422
PCT Pub. Date: May 28, 2020

(65) Prior Publication Data
US 2022/0010829 A1    Jan. 13, 2022

(30) Foreign Application Priority Data
Nov. 23, 2018  (EP) .................................. 18382845

(51) Int. Cl.
*F16B 7/04*    (2006.01)
*F16B 5/00*    (2006.01)

(52) U.S. Cl.
CPC .......... *F16B 7/0433* (2013.01); *F16B 5/0032* (2013.01)

(58) Field of Classification Search
CPC ... F16B 7/0433; F16B 5/0032; Y10T 24/3444
See application file for complete search history.

(56) References Cited

U.S. PATENT DOCUMENTS 2,354,485 A    7/1944  Slaughter
3,291,437 A *  12/1966 Bowden ................ E04G 13/021
                                                    220/4.16

(Continued)

FOREIGN PATENT DOCUMENTS

GB        2488570 A        9/2012
WO    WO2013102274 A1      7/2013
WO    WO2016176340 A2     11/2016

OTHER PUBLICATIONS

European Patent Office; International Search Report and Written Opinion for PCT/EP2019/081739; dated Feb. 26, 2020; entire document.

*Primary Examiner* — Robert Sandy
(74) *Attorney, Agent, or Firm* — Allen, Dyer, Doppelt & Gilchrist, P.A.

(57) ABSTRACT

The proposed morphable sheet structure comprises a succession of adjacent flexible elongated rods (10) laterally connected to each other defining a sheet structure (1), each rod (10) defining a longitudinal axis (A); wherein the rods (10) are grouped in pairs, each pair of adjacent rods (10) are connected to each other through a first connector (11) tightly connected to a second connector (12) complementary with the first connector (11), being the first connector (11) part of one rod (10) of said pair of adjacent rods (10) and being the second connector (12) part of the other rod (10) of said pair of adjacent rods (10); being the first connector (11) and the second connector (12) slidably movable to each other in the (Continued)

direction of the longitudinal axis (A); the first connector (11) and/or the second connector (12) extending along the entire longitude of the rod (10).

20 Claims, 9 Drawing Sheets

(56) References Cited

U.S. PATENT DOCUMENTS

| | | | |
|---|---|---|---|
| 3,836,979 A | 9/1974 | Kurland et al. | |
| 3,951,294 A * | 4/1976 | Wilson | B65F 1/02 |
| | | | 47/33 |
| 4,033,137 A | 7/1977 | Geist | |
| 4,432,591 A | 2/1984 | Rinkewich | |
| 6,488,703 B1 | 12/2002 | Kveen et al. | |
| 8,959,871 B2 * | 2/2015 | Parenti | E04C 3/36 |
| | | | 52/170 |
| 2010/0274350 A1 | 10/2010 | Richter | |
| 2014/0232611 A1 | 8/2014 | Ochoa et al. | |

* cited by examiner

MORPHABLE SHEET STRUCTURE

TECHNICAL FIELD

The present invention relates to a morphable sheet structure which can be flexed, bended and twisted and which shape can be modified, providing a sheet structure with adaptable or programmable shape. More specifically, the present invention enables the morphing from a planar (flat) or cylindrical (curved along one direction) sheet into various doubly curved shapes (surfaces with non-zero Gaussian curvature).

This sheet structure can be used for many applications, for example implantable stents, deployable constructions such as antennas, solar panels or sails, adaptive skins for organic architecture, soft robots or haptics.

STATE OF THE ART

Flexible deformable sheet structures are known in the state of the art.

For example, document WO2016176340 describe a soft-robot created using a sheet structure including alternated inelastic and elastic fibers. The elastic fibers allow a shear movement between the parallel inelastic fibers within the elastic limit of the elastic fibers, which typically is an important limitation in the freedom of movement of the sheet structure. This solution also allows the increase or decrease of the distance between the inelastic fibers producing the modification of the area of the sheet structure, preventing the sheet structure to withstand traction or compression forces of the sheet structure without deforming its shape or size.

Documents US2010274350 and U.S. Pat. No. 6,488,703 describe sheet structures also including elastic connections which will allow the shear movement between parallel rods within the elastic limit of the elastic fibers producing a limited shear movement, but which also will allow the modification of the distance between said parallel rods, producing the variation of the area of the sheet structure. In those cases, the proposed sheet structure does not provide a continuous sheet structure, but an openworked structure.

Documents U.S. Pat. No. 3,836,979 and US2014232611 describe collapsible tubular sheet structures in which the flexible parallel rods are connected to each other on discrete points through inelastic collapsible bands. This solution permits the modification of the distance between rods by collapsing said bands.

Documents WO2013102274A1, U.S. Pat. No. 2,354,485, GB2488570, U.S. Pat. Nos. 4,033,137 and 4,432,591 describe sheet structures including rods connected to each other, where the rods are either rigid or flexible only in one of the two transverse directions perpendicular to the longitudinal axis. As such, none of these sheet structures can deform into a doubly curved shape with non-zero Gaussian curvature.

In view of the state of the art, improvements are required to obtain a morphable sheet structure able to produce a doubly curved shape with non-zero Gaussian curvature in a precise and controllable manner. Those improvements are described below.

BRIEF DESCRIPTION OF THE INVENTION

The present invention relates to a morphable sheet structure. It will be understood that a morphable sheet structure is a membrane-like element, forming a thin plate which can be deformed, flexed or twisted.

The proposed morphable sheet structure comprises a succession of adjacent flexible rods laterally connected to each other defining a sheet structure, each rod having two ends and defining a longitudinal axis from one end to the other end.

When the rod is in an extended position, the longitudinal axis shall be understood to be a straight line through the entire length of said rod at its center, and when the rod is bent, the longitudinal axis which continues to cross the entire length of the rod at its center shall also be bent.

The proposed morphable sheet structure further comprises the following features known in the state of the art:
- the rods are grouped in pairs;
- each pair of adjacent rods are connected to each other through a first connector tightly connected to a second connector complementary with the first connector, being the first connector part of one rod of said pair of rods and being the second connector part of the other rod of said pair of rods;
- being the first connector and the second connector slidably movable to each other in the longitudinal axis direction; and
- the first connector and/or the second connector extends along the entire longitude of the rod.

The present invention further proposes, in a manner not known in the state of the art, the following features.

The flexible elongated rods are bendable or twistable producing the bending or twisting of said longitudinal axis simultaneously with the sliding movement and independently of the relative position between adjacent rods, i.e. said rods are bendable or twistable along its longitudinal axis. The sliding movement between adjacent rods can be driven by the bending or twisting of the individual rods and/or the bending or twisting of individual rods can be driven by the sliding movement between adjacent rods.

In other words, the rods, including first and second connectors, are flexible so that the sheet structure as a whole can be bent along any direction and the first and second connectors are such that the rods can freely slide relative to each other in the direction of their longitudinal axes modifying the shape of the sheet structure.

The proposed invention is capable of modifying the shape of the mid surface of the sheet form one without curvature or curvature only along one direction (surface with zero Gaussian curvature) to a doubly curved sheet (surface with non-zero Gaussian curvature), extending the range of shapes that can be obtained from a flat sheet with respect to the state of the art.

The first and second connectors when connected to each other produce a continuous sheet structure and permit a relative sliding movement between adjacent rods in the direction of the longitudinal axes, modifying the shape of the sheet structure.

The rods may have a constant cross section along its longitude or along its longitudinal axis, typically permitting its assembly generating a flat or a cylindrical sheet structure.

Said rods may have along its longitude holes or local reductions of the cross section, affecting the elastic properties of the sheet structure and possibly producing a porous sheet structure.

Alternatively or additionally, said rods may have a variable width and/or a variable cross section along its longitude or along its longitudinal axis, typically permitting its assembly generating a non-flat sheet structure.

It will be understood that the width of each rod is measured in a transverse direction perpendicular to the longitudinal axis and tangent or coplanar with the sheet structure on that point.

According to an additional proposed feature, said rods are inextensible and incompressible in a longitudinal direction parallel to the longitudinal axis, preventing the elongation or the shortening of the sheet structure in the direction of the longitudinal axes when a force is applied to it in the direction of said longitudinal axes.

This feature allows the modification of the sheet structure without modifying its area and permits the precise prediction of the resulting shape of the sheet structure produced by a predefined sliding movement between adjacent rods.

The first connector and the second connector can be also configured to retain adjacent rods at a constant distance, i.e. the rods are tightly interlocked so that the sheet structure assembly can resist forces trying to separate those rods apart in the transversal direction perpendicular to the longitudinal axes, preventing the elongation of the sheet structure when a force is applied to it in the direction perpendicular to said longitudinal axes. There is no gap between the first and second connectors preventing a play movement between them, so that a compression force trying to approximate two adjacent rods does not produce any movement.

According to this feature, a traction or compression force applied perpendicular to the longitudinal axes of said adjacent rods will be withstood by said first and second connectors connected to each other without changing the distance between said adjacent rods.

This feature can be achieved by a tight connection between the first connector and the second connector, preventing the relative movement of the first connector regarding the second connector in the transversal direction perpendicular to the longitudinal axes of the adjacent rods, but permitting the sliding movement.

Preferably the first connector and the second connector are inextensible and incompressible in a transversal direction perpendicular to the longitudinal axis, preventing the modification of said distance when a force in the transversal direction is applied.

Optionally between the first and the second connecter a limited rotational movement is permitted so that the angle between two adjacent rods, in the transverse direction, can be freely adjusted within a limited range defined by said rotational freedom between the first and the second connectors, for example by said first and second connectors having a cylindrical shape.

According to one embodiment of the present invention each rod includes one first connector and one second connector, so that first connector of one rod can be connected to the second connector of an adjacent rod forming a chain.

Alternatively, it is proposed to include two first connectors on each rod of a first group of rods and to include two second connectors on each rod of a second group of rods, being the rods of the first group and the rods of the second group alternated. This construction permits to alternate one rod of the first group of rods with one rod of the second group of rods, connecting the first connectors of the rods of the first group of rods to the second connectors of the rods of the second group of rods, forming a chain.

It is also proposed, as a non-limitative alternative, placing the first and/or second connectors of one single rod on opposed sides of said single rod, being the rod in-between said first and/or second connectors.

A preferred embodiment of said first and second connectors include:

the first connector comprising a channel accessible through a narrowed mouth slot;

the second connector comprising a flap equal or thinner than the narrowed mouth slot and a thickened end of the flap thicker than the narrowed mouth slot;

being the flap of each rod tightly fitted on a narrowed mouth slot of an adjacent rod and being the correspondent thickened end inserted into the correspondent channel of the adjacent rod.

This particular construction permits the tight connection between the first and the second connectors, the sliding movement between adjacent rods and to retain adjacent rods together.

Said narrowed slot can be dimensioned to allow a rotational movement between the first and the second connectors, within a predefined range. The cross section of the first and/or the second connector may be variable along the longitudinal direction.

Starting from a planar sheet structure, sliding each pair of rods equally and uniformly along the longitudinal axes will simply change the shape of the edge of the sheet structure but not its planarity.

If the sliding displacement between adjacent rods is not constant along the rods, however, the sheet structure will in general become curved, possibly doubly curved (with non-zero Gaussian curvature), changing its shape to avoid stretching of the rods or of the first and second connectors.

The rods are preferably elastically bendable in directions transversal to the longitudinal axis and may be made to have a preferential state of bending and twisting which can be the same for all rods or can be different from rod to rod. When the rods are bended or twisted away from their preferred state, they store elastic energy which can be released when the bending or twisting force disappears. This defines an equilibrium shape of each rod, and one or multiple stable shapes of the sheet structure urged by the equilibrium distribution of the elastic energies stored in each rod. The rods can have unequal elastic properties, so that some will store more elastic energy than others.

When external forces are applied on the sheet structure, it can be morphed changing its shape, for example producing bending of one of said elastically bendable rods which accumulates elastic energy. Once the external force disappears, the elastic energy stored on said elastically bendable rod is released urging the morphing of the sheet structure to the stable shape.

For example, being the stable shape of the rods a straight shape, the stable shape of the sheet structure can be a flat shape, or a tubular shape with longitudinal rods.

The sheet structure can have multiple stable positions.

For example, half of the rods can have a straight stable shape, and half of the rods can have a bended stable shape, and the competition of elastic energy between these two groups of rods can produce different stable shapes of the sheet structure.

If friction against sliding of adjacent rods is low and in the absence of external forces, the sheet structure will change shape towards a stable shape to release as much stored elastic energy as possible. Away from those stable shapes, shape can be actively maintained applying an external force, or can be maintained by friction between the rods. Furthermore, because of the existence of several stable states, a sheet structure can switch between such low-energy states.

Each rod, including the first and/or second connectors, can be made of a single material.

The morphing capability of the proposed sheet surface relies on the microarchitecture of the assembly. As such, it imposes minimal requirements on the base material, and avoids a complex assembly of elements of various types made out of different materials, or the use of complex materials. As a result, the proposed technology is compatible with common additive manufacturing (3D printing).

The sheet structure can have varying degrees of porosity depending on the specific design of the rods and of the first and second connectors, going up to continuous sheet structure. Exploiting the fact that the overlap between gaps in adjacent rods depends on their relative sliding, it is possible to tune surface porosity concomitantly with shape changes.

In contrast with other approaches, the shape-morphing principle of the sheet structure does not set a tight limit on the magnitude of shape changes or on the achievable shapes. The magnitude of sliding is only limited by the length of the rods.

According to an additional embodiment of the proposed invention, the sheet structure can be a tubular structure, being the second connector of a last rod of the sheet structure connected to the first connector of a first rod of the sheet structure creating a tube.

If the rods have all a constant cross section, the tubular structure can be for example a cylinder.

If the sheet structure forms a tubular construction such as a cylinder (singly curved and thus with zero Gaussian curvature), even a uniform sliding displacement between all the rods will produce a shape change (changing length and diameter of the cylinder and helicity of the rod elements), though one not producing non-zero Gaussian curvature. However, non-uniform sliding will lead to various shapes, which in general are doubly curved surfaces (with non-zero Gaussian curvature).

For example, a non-uniform twisting of the two ends of the tubular structure will produce a non-uniform morphing of the diameter on both ends of the tubular structure, generating for example a trumpet-like shape with negative Gaussian curvature (one curved along two directions with different sign). Other surfaces with positive Gaussian curvature or combining regions with positive, negative and zero Gaussian curvature are also possible.

A non-uniform twisting of the central region of the tubular structure in regard to the two opposed ends of the tubular structure will produce a non-uniform morphing of the diameter of the central region in regard to the two opposed ends, producing a hyperboloid shape or a spindle shape.

It is proposed, in a non-limitative way, that at least one rod is made of a material selected among:
shape-memory material;
bimorph piezoelectric actuator;
responsive polymer; or
responsive hydrogel; or
pneumatically inflatable element,
said material being tuned or controlled to produce multiple stable shapes or to modify its stable shape.

It is also proposed, in a non-limitative way, that at least one of the rod is coupled to
a pneumatically inflatable element, or
an eccentric string or cable whose tension or length can be externally controlled,
so that the actuation of these systems can change the shape of the said rod.

The sheet structure can be re-configured by the driven shape transformation of the individual rods, by an internal actuator configured to produce the sliding movement between the first and the second connectors of two adjacent rods, or by an external actuator configured to apply forces to the sheet structure causing its deformation and the deformation of the rods constitutive of the sheet structure.

According to that, at least some of the rods are:
driven rods configured to produce the active controlled bending or twisting thereof, and/or
linked rods which are linked to each other through an internal actuator configured to produce a relative sliding movement between said linked rods, causing the bending or twisting thereof; and/or
externally actuated rods which are connected to an external actuator configured to produce a local movement of parts of the sheet structure, causing the deformation of the sheet structure and the bending or twisting of at least some of the rods (10).

Each driven rod, or each internal actuator or each external actuator can be made or can include structures made of a driven material which changes its shape under predefined conditions, such ambient conditions, electric conditions or magnetic conditions, or inflation pressure or volume for the case of pneumatic elements (e.g. through bimorph piezoelectric actuators, shape-memory materials, responsive polymers or responsive hydrogels, or inflation pressure or volume for the case of pneumatic elements, or the tension or length in an eccentric cable), creating different sheet structure shapes through the control of the shape of said rods.

The shape transformation of the rods includes its bending or twisting in the direction of the longitudinal axis, producing the bending or twisting of said longitudinal axis together with the deformation of the rod. As a consequence of the shape deformation of the individual driven rods, the sheet structure also suffers deformation, and also the sliding movement between adjacent rods can be obtained induced by the bending or twisting or the individual rods, for example introducing a differential bending or twisting in adjacent rods, and/or introducing bending or twisting in rods of a tubular sheet structure.

Alternatively, the shape transformation of the rods can be induced by pressurizing or changing the volume of inflatable elements attached to the rods or using inflatable tubes as rods.

Said driven material integrated in the driven rods can be configured, according to a preferred embodiment, to change its longitude, bend or twist under predefined conditions and is eccentrically attached to the driven rod, imposing the bending or twisting to the said driven rod. When the eccentrically attached structure changes its longitude, it imposes a curvature to the rest of the rod where it is eccentrically attached. In a preferred embodiment, this attached structure is an eccentric string or cable whose length or tension can be externally controlled.

Alternatively said eccentrically attached structure bends or twists under said predefined conditions, imposing the bending or twisting to the rod to which it is attached.

One single rod can include multiple eccentrically attached structure on one or on both sides thereof. If said structures are located on both sides of the same rod, said rod can be bended on two opposed directions at will.

It is also proposed to connect each single rod or different groups of rods to a control device configured to provide controlled amounts of electric current to said rod or rods, producing its controlled shape transformation.

Some or all the rods can also include different active segments along its longitude, each individual active segment being independently controllable. Each individual active segment of the same rod can be configured, for example, to change its shape under different ambient, electric or magnetic conditions, or inflation pressure, for example different active segments being tuned to active the change of its shape under different ambient parameters such temperature, or under different electric or magnetic conditions, or inflation pressure. This will allow to control which active segment change its shape by controlling said ambient, electric or magnetic parameters, or inflation pressure.

Alternatively, each active segment can be independently connected to the control device for its independent activation.

To produce the deformation of the sheet structure by an internal actuator, a sliding movement between the first connector and the second connector of two adjacent rods is produced by an internal actuator.

The internal actuator can integrate driven material which will be configured to change its longitude, bend or twist under predefined conditions, such ambient, electric or magnetic conditions, or inflation pressure. Said internal actuator will be connected to said linked rods, imposing a sliding movement between the two linked rods as a consequence of the controlled deformation of said internal actuator.

When the attached structure changes its longitude, it produces the relative separation or the approximation of two points of the two adjacent rods where the structure of driven material is attached. Because the first and second connectors prevent the approximation or separation of the two adjacent rods, said movement causes the sliding movement between the two adjacent rods.

According to an alternative proposed embodiment said internal actuator can be, for example, a pneumatic actuator, an electric motor or servomotor, an electric lineal motor or servomotor or a magnetic actuator configured to produce the sliding movement between the first and second connectors connected to each other.

It is also proposed that said internal actuator connects at least two non-adjacent rods, producing the sliding movement between rods placed between the at least two non-adjacent connected rods.

To produce the deformation of the sheet structure by an external actuator it is proposed to connect an external actuator to the sheet structure to produce a local movement of parts of the sheet structure, causing its deformation as a whole, preferably in regard to an external supporting point where the external actuator is connected.

According to a preferred embodiment said external actuator is simultaneously connected to a plurality of rods.

Said external actuator can be for example a pneumatic actuator, an electric motor or servomotor, an electric lineal motor or servomotor or a magnetic actuator.

Another proposed example of said external actuator can be a structure made of a driven material which changes its shape under predefined conditions, such ambient conditions, electric conditions or magnetic conditions, or inflation pressure or tension of an eccentric cable. When said structure changes its shape, it produces the deformation of the sheet structure.

Said driven material integrated in the external actuator is preferably configured to change its longitude, bend or twist under predefined conditions and is connected to said externally actuated rods.

According to an embodiment of the present invention, the predefined conditions under which the driven material changes its shape are predefined electrical conditions. In such case the driven material will be connected by wires to a control device configured to provide controlled amounts of electric current to said driven material, producing its controlled shape transformation.

A simple shape-memory effect for autonomous deployment of the sheet structure can be obtained. By endowing the rod elements with spontaneous curvature or torsion, so that they are naturally bent and twisted, it is possible to reconfigure a naturally curved sheet structure (a 3D curved stable state) into a cylindrical one with straight elements, which can be further folded. By releasing folding constraints, the original 3D shape can be recovered by elastic spring-back if friction between rods is low.

Preferably the first and second connectors are made or covered with a low friction material to enable morphing by sliding of adjacent connectors. However, increasing or tuning friction, possibly on demand, can be used to lock a given shape, or to control the moment of autonomous deployment.

As a mechanical system, sheet structures have their own mechanical properties resulting from the collective deformation of rods and their interaction. These mechanical properties, such as stiffness with respect to variations in radius or length in cylindrical sheet structures, change during shape transformations. As such, sheet structures are systems with tunable mechanical properties, which also depend on the bendability, twistability and spontaneous bending or twist of the rods.

It will be understood that references to geometric position, such as parallel, perpendicular, tangent, etc. allow deviations up to ±5° from the theoretical position defined by this nomenclature.

The elastic, inelastic, inextensible, incompressible, flexible and rigid properties of elements shall be understood as referring to the apparent properties that those elements exhibit under normal conditions of use, by applying forces below a pre-established threshold of forces intended for the normal use of that element in a particular application.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and non-limitative manner, in which.

Figure 1:
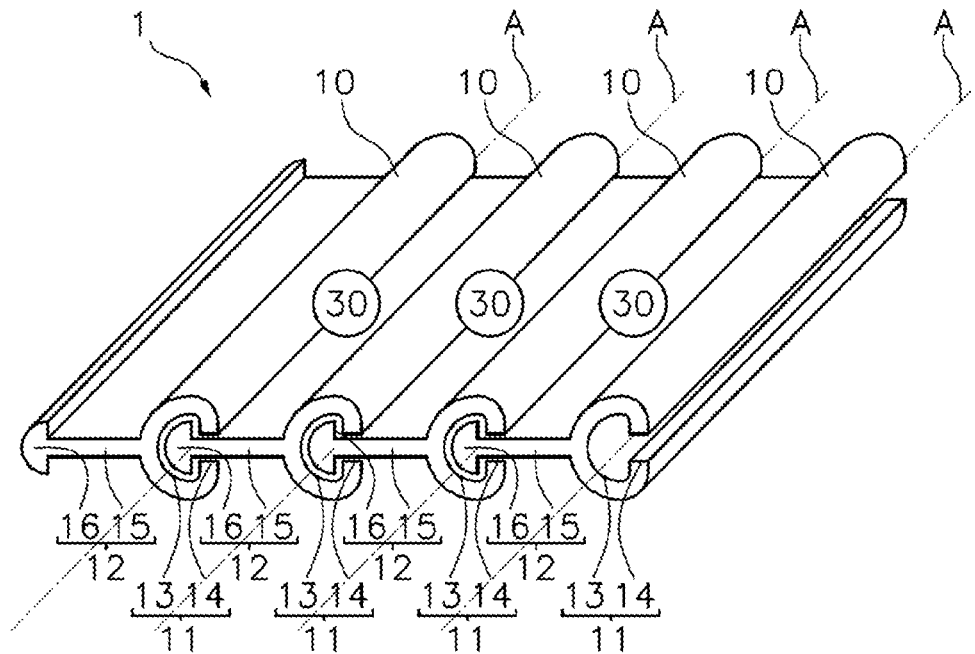
FIG. 1 shows a morphable sheet structure according to a first embodiment.

On most of those Figures the rods have been shown as flat bands with lateral edges in contact. It will be understood that said flat bands are a schematic view of the rods described on this document and shown in detail in FIGS. 1 to 4.

DETAILED DESCRIPTION OF AN EMBODIMENT

The foregoing and other advantages and features will be more fully understood from the following detailed description of an embodiment with reference to the accompanying drawings, to be taken in an illustrative and not limitative, in which:

FIGS. 1, 2, 3 and 4 shows a flat morphable sheet structure 1 produced by four parallel rods 10 made of flexible material such plastic.

On those Figs. each rod 10 is shown having a straight shape, defining on its center a longitudinal axis A. It will be understood that the bending or twisting of said flexible rods 10 will produce also the bending or twisting of said longitudinal axis A.

Each pair of two adjacent rods 10 are connected to each other by a first connector 11 tightly connected with a second connector 12.

On those examples the first connector 11 includes a channel 13 extending along the entire longitude of one rod 10, being said channel 13 accessible through a narrowed mouth slot 14 extending also along the entire longitude of the correspondent rod 10.

The second connector 12 includes a flap 15 with a thickened end 16 on its end, both the flap 15 and the thickened end 16 also extending along the entire longitude of one rod 10.

The thickened end 16 of the second connector 12 of one rod 10 is tightly fitted inside the channel 13 of one first connector 11 of one adjacent rod 10, passing the flap 15 through the correspondent narrowed mouth slot 14.

This solution produces the connection between two adjacent rods 10 allowing the sliding movement of the first connector and the second connector to each other in the direction of the longitudinal axis A of the correspondent rods 10 modifying the shape of the morphable sheet structure 1 and maintaining said adjacent rods 10 at a constant distance.

A succession of pairs of adjacent rods 10 generate a morphable sheet structure 1.

Figure 2:
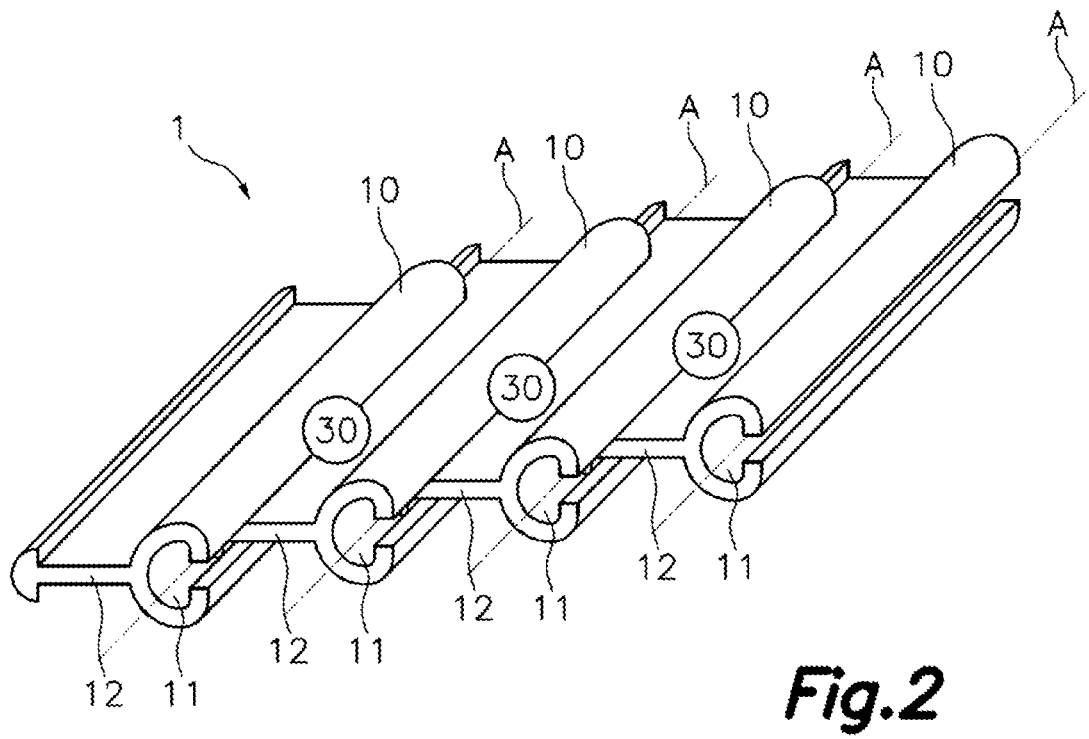
FIG. 2 shows the morphable sheet structure shown on FIG. 1 after a sliding movement produced between adjacent rods.
Figure 4:
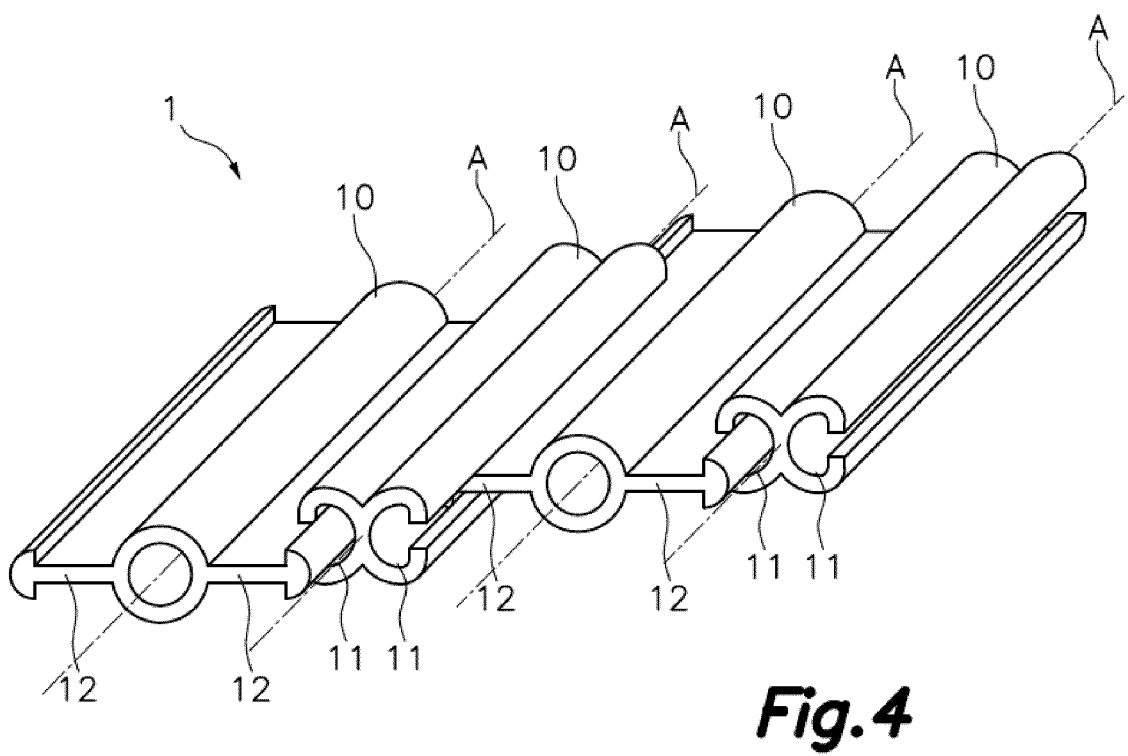
FIG. 4 shows the morphable sheet structure shown on FIG. 3 after a sliding movement produced between adjacent rods.

On FIGS. 2 and 4 it is shown the shape modification obtained by the sliding movement produced between adjacent rods 10.

FIGS. 1 and 2 shown a first embodiment of the morphable sheet structure 1 in which each rod 10 includes one first connector 11 and one second connector 12, being all the rods 10 identical.

Figure 3:
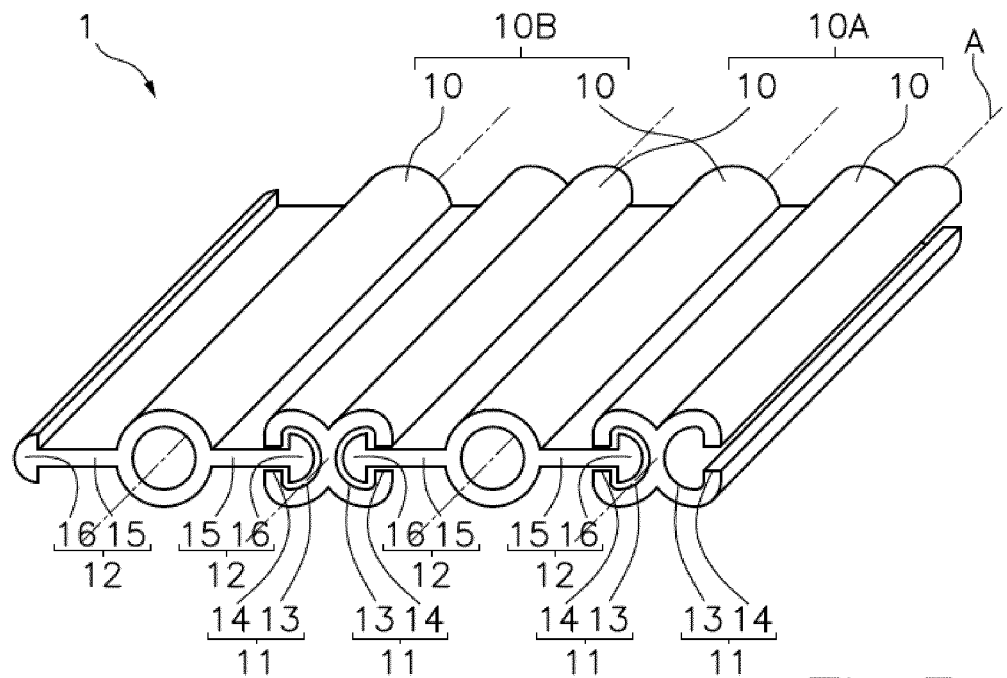
FIG. 3 shows a morphable sheet structure according to a second embodiment.

FIGS. 3 and 4 shown a second embodiment of the morphable sheet structure 1 in which each rod 10 of a first group of rods 10A include two first connectors 11, and each rod 10 of a second group of rods 10B include two second connectors 12, being the rods of the second group of rods 10B alternated with the rods 10 of the first group of rods 10A.

Preferably the first and second connectors 11 and 12 are made of the same material than the rod 10 being also flexible.

According to a preferred embodiment each rod 10 is apparently inextensible and incompressible under forces applied in a longitudinal direction parallel to the longitudinal axis A below a pre-established threshold of forces intended for the normal use of that element in a particular application. So, the longitude of each rod 10 does not modify when a force is applied on said rod 10 in the direction of the longitudinal axis A.

It is also preferred the first and second connectors 11 and 12 being apparently inextensible and incompressible under forces applied in a transversal direction perpendicular to the longitudinal axis A below a pre-established threshold of forces intended for the normal use of that element in a particular application. So, the distance between adjacent rods 10 connected to each other through the first connector 11 and the second connector 12 does not modify when a force is applied on said connector in a direction perpendicular to the longitudinal axis A.

Those features assure that the area of the morphable sheet structure 1 does not changes when forces are applied to it, and also permits to forecast the shape of the morphable sheet structure 1 to be obtained when forces are applied to it with higher precision.

Figure 5:
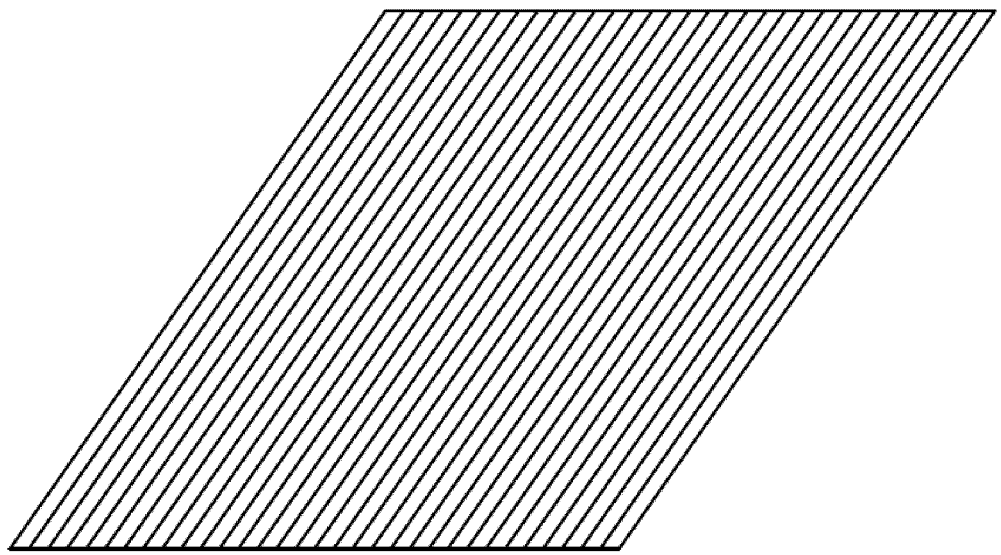
FIG. 5 shows a perspective view of a sheet structure having a flat shape.

FIG. 5 shows a completely flat sheet structure 1 made of straight rods 10 in perspective.

Figure 6:
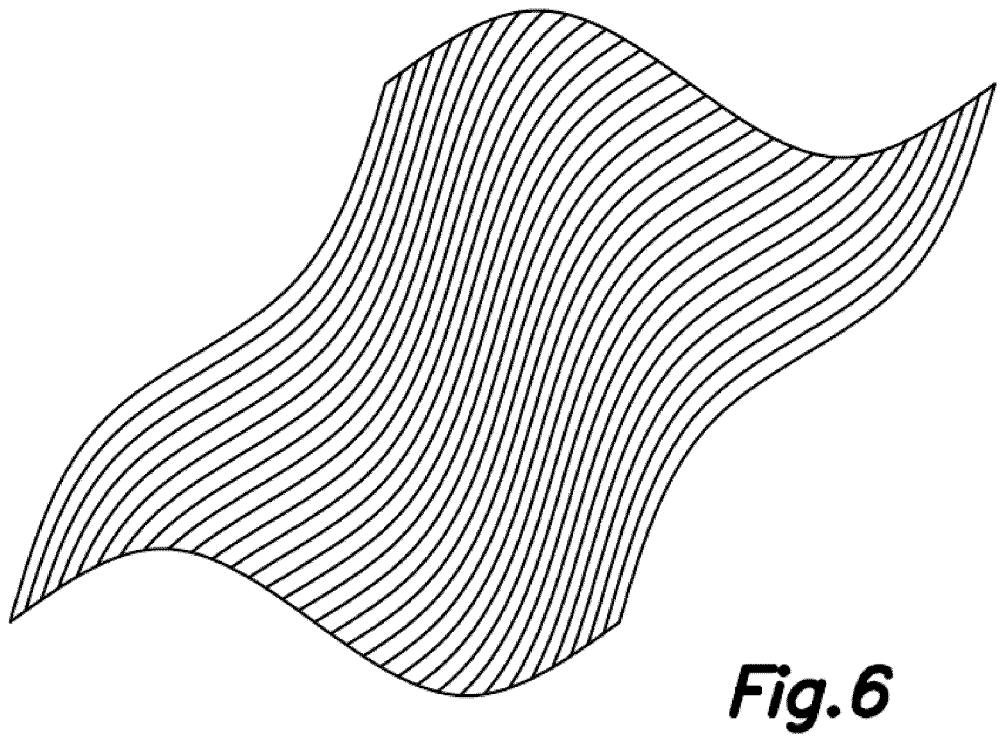
FIG. 6 shows a perspective view of the sheet structure shown on FIG. 5 after its deformation without producing sliding movement between adjacent rods but bending said rods producing a wavy surface.

FIG. 6 shows a morphed shape of the same sheet structure 1 shown on FIG. 5 obtained without sliding the adjacent rods 10 but only bending the sheet structure producing a wavy shape.

The morphable sheet structure 1 can also be configured as a tubular sheet structure in which one initial rod 10 of the sheet structure 1 is connected to one end rod 10 of the same sheet structure 1 producing a continuous sheet structure with a tubular nature. FIGS. 7 to 10 shown different embodiments of said tubular sheet structures 1.

A tubular sheet structure 1 in the shape of a cylinder will have the longest longitude and the smaller diameter when the rods 10 are straight extending along the entire longitude of the cylinder.

A uniform sliding movement between adjacent rods 10 will morph the shape of each rod 10 acquiring a helical shape. As sliding increased, cylinders become shorter and with increasing diameter, and the pitch of the helical rods 10 becomes shorter.

Figure 7:
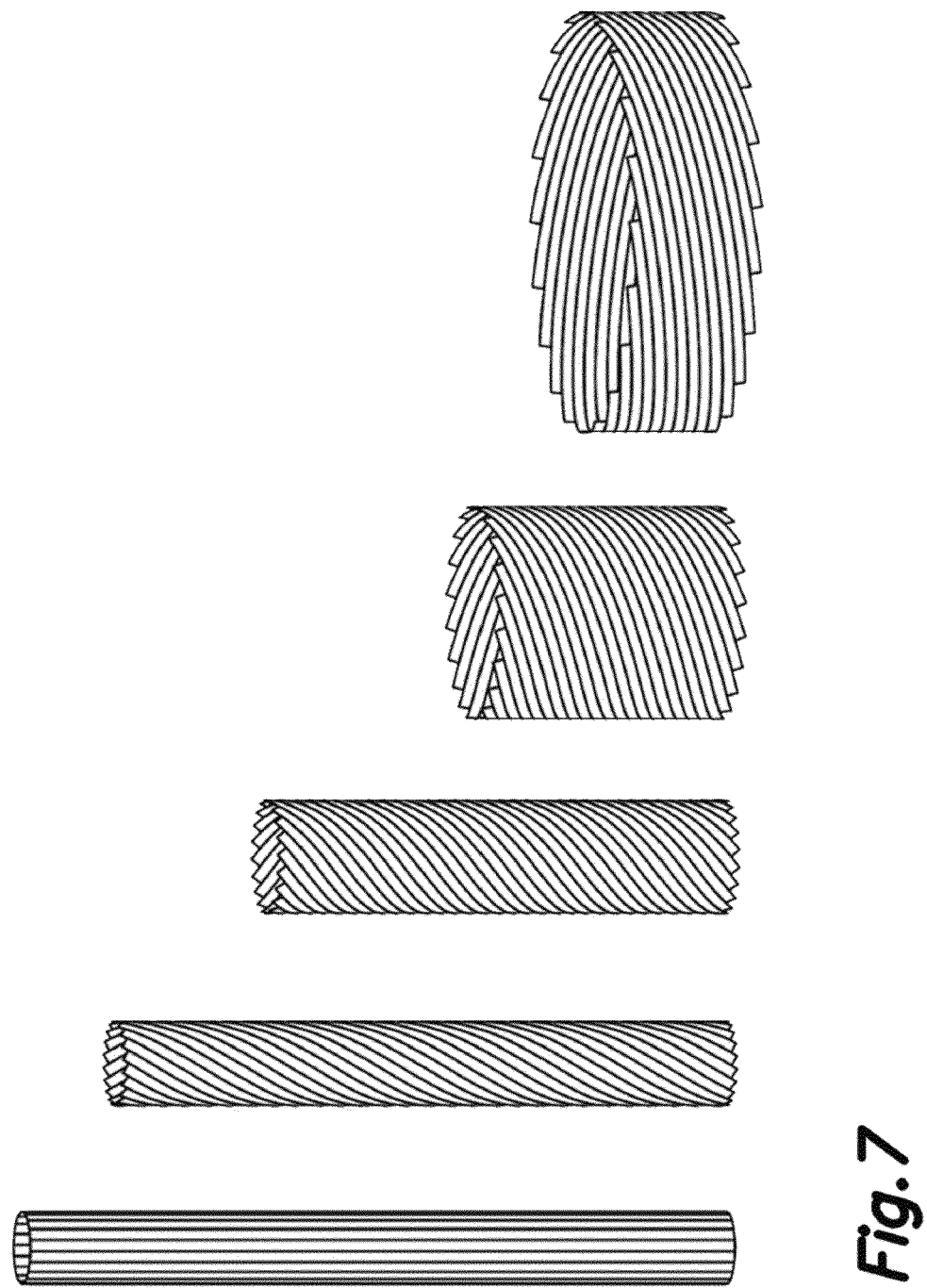
FIG. 7 shows five different views of the same tubular morphable sheet structure having different longitudes and diameters but the same area, the five different views corresponding to morphed shapes of the same tubular sheet structure obtained by twisting both ends of the tubular sheet structure on opposed directions in different degrees, producing sliding displacement between adjacent rods.

FIG. 7 shown a cylindrical sheet structure 1 including twenty rods 10 at distinct values of the helix angle. The helix angle value of the rods 10 on each embodiment shown are 0, 30, 50, 70 and 80 deg from left to right of the FIG. 7.

Figure 8:
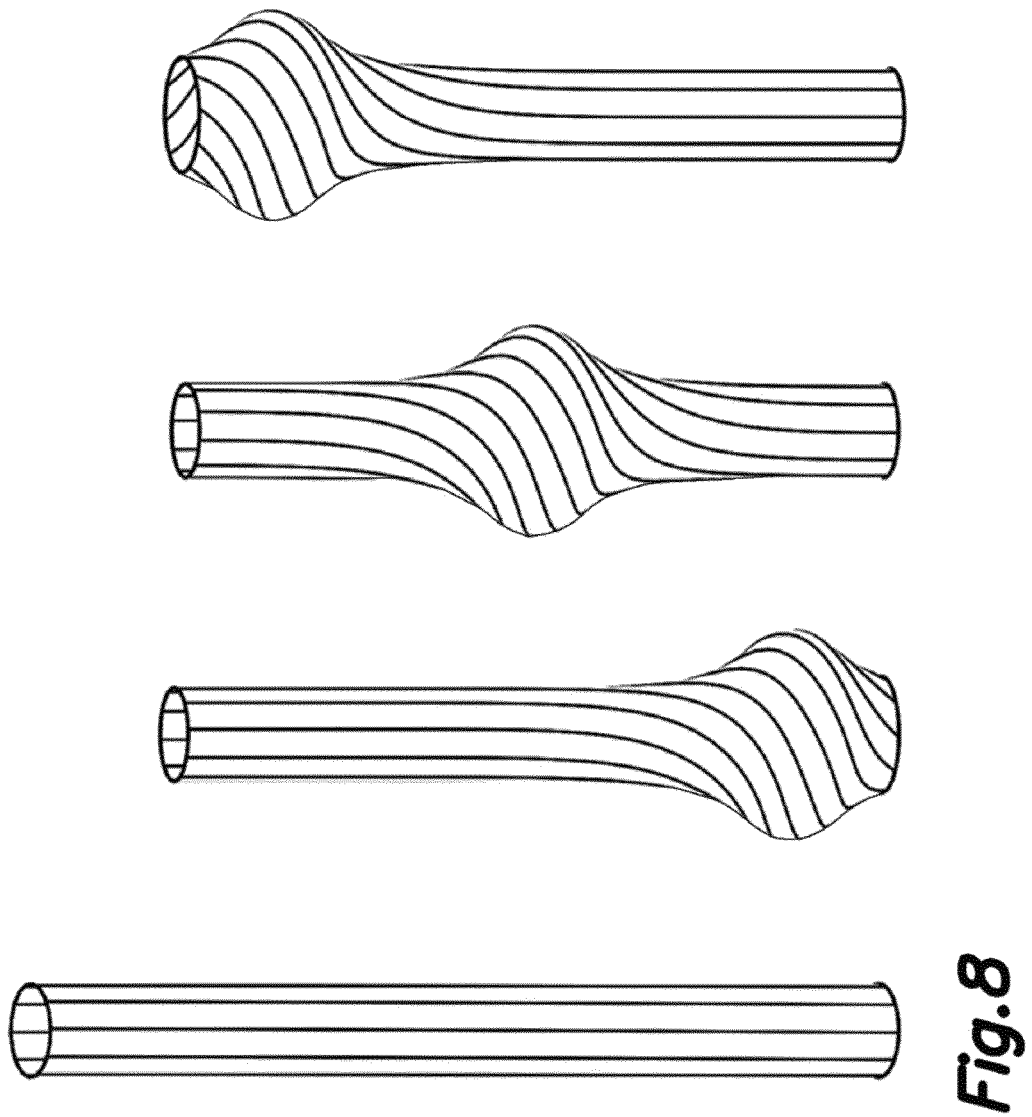
FIG. 8 shows four different views of the same tubular morphable sheet structure having different longitudes and shapes (with regions of positive, negative and zero Gaussian curvature) but the same area, the four different views corresponding to morphed shapes of the same tubular sheet structure obtained by twisting two portions of the tubular sheet structure on opposed directions, producing sliding displacement between adjacent rods in an intermediate region of the tubular sheet structure generating a bulge between the two portions twisted.

FIG. 8 shown different alternative shapes which can be obtained starting from a cylindrical sheet structure 1, producing a cylindrical shape with a bulge in a central region thereof.

Surfaces involving non-constant Gaussian curvature (zero, negative and positive) are also possible, producing a localized bulge which can be placed or moved along an otherwise cylindrical sheet structure 1.

The sliding displacement between adjacent rods 10 is a Gaussian function of the length along the rod 10.

In this case those shapes can be achieved through a sliding movement affecting only a central portion of the first and second connectors 11 and 12, each rod 10 having a helical shape only on said central region, so producing a non-constant sliding movement along the rods 10.

This can be produced for example rotating cylindrical end portions of the cylinder on opposed directions being the bulge produced between said cylindrical end portions.

Figure 9A:
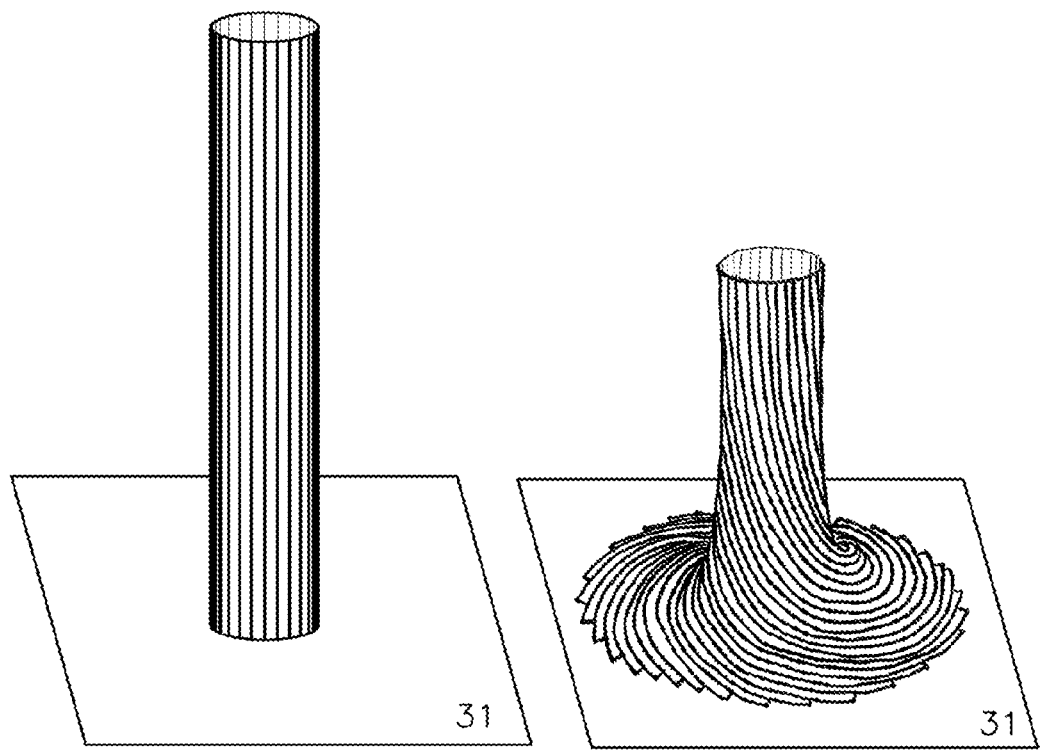
FIG. 9A shows two different views of the same tubular morphable sheet structure having different longitudes and shapes (now doubly curved with negative Gaussian curvature), obtained by twisting one end of the tubular sheet structure keeping the opposed end of the tubular sheet structure untwisted, producing sliding displacement between adjacent rods on one end generating a trumped shape.

If the sliding between adjacent rods 10 affects only one end portion of each rod 10 then, starting from a cylinder, a trumpet-shape is generated as shown on FIG. 9A. This shape can be produced rotating one end of the cylinder sheet structure while an opposed end portion of the cylindrical sheet structure is kept un-twisted.

Many different shapes can be obtained starting from a cylinder sheet structure 1. As shown on FIG. 10 also cone-shapes, disc-shapes, trumpet-shapes (flared), sphere-shapes and tire-shapes can be obtained controlling the sliding movement between adjacent rods 10.

A tire-shape is a solid of revolution obtained from a C-shape generatrix with its open side facing the axis of revolution of said solid of revolution.

Starting from a cylindrical sheet structure, a wide family of shapes is achievable by sliding rod elements non-uniformly along their length. The figure illustrates some of the possible deformation paths involving axisymmetric shapes, and includes shapes of zero Gaussian curvature (cylinders, disks and cones), surfaces with constant positive Gaussian curvature (spindles, spheres and bulges), and surfaces of constant negative Gaussian curvature (trumpet-shapes or pseudo-spheres).

Also, a collapse of the tubular sheet structure 1 can be produced.

The morphing of the tubular sheet structure 1 can be achieved producing a controlled sliding movement between adjacent rods, for example using an internal actuator 30, or applying an external force to the sheet structure 1, for example using an external actuator 31.

In the embodiments shown on FIG. 7 a twisting force applied on the two opposed ends of the cylinder in opposed directions will modify the shape of the rods 10 and will produce its sliding movement.

Alternatively, the morphing of the sheet structure 1 can be controlled through the control of the shape of the rods 10, for example using shape-memory materials, bimorph piezoelectric elements, responsive polymers; or responsive hydrogels.

Also, it is proposed the use of rods 10 being elastically bendable in a transverse direction perpendicular to the longitudinal axis A thereof, i.e. that in absence of an external force the rod 10 will adopt a predefined stable shape and when an external force produce the bending of said rod 10 it will store elastic energy which will be released when the external force disappear returning the rod 10 to the stable shape.

Figure 9B:
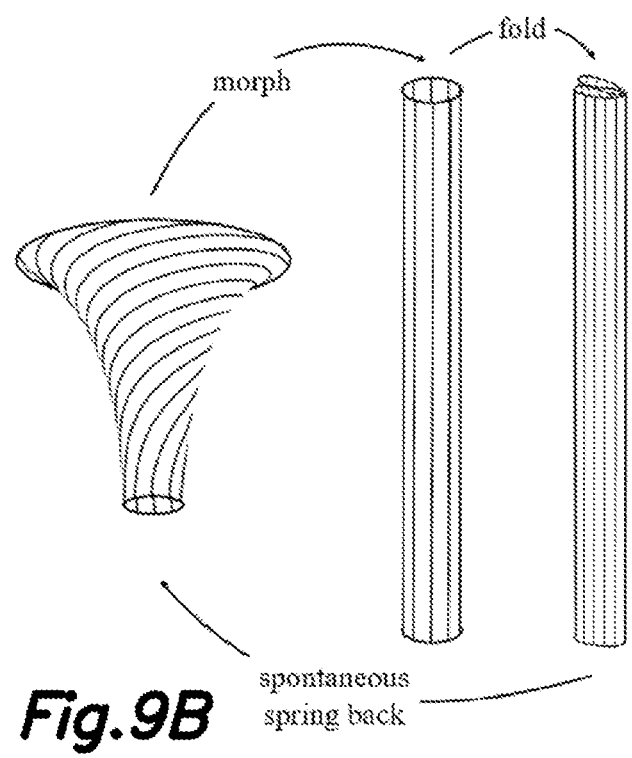
FIG. 9B shows the same tubular morphable sheet structure shown on FIG. 9A, but in which the sheet structure has a trumpet-shape stable shape morphable into a cylindrical shape, and being the sheet structure collapsible.
Figure 10:
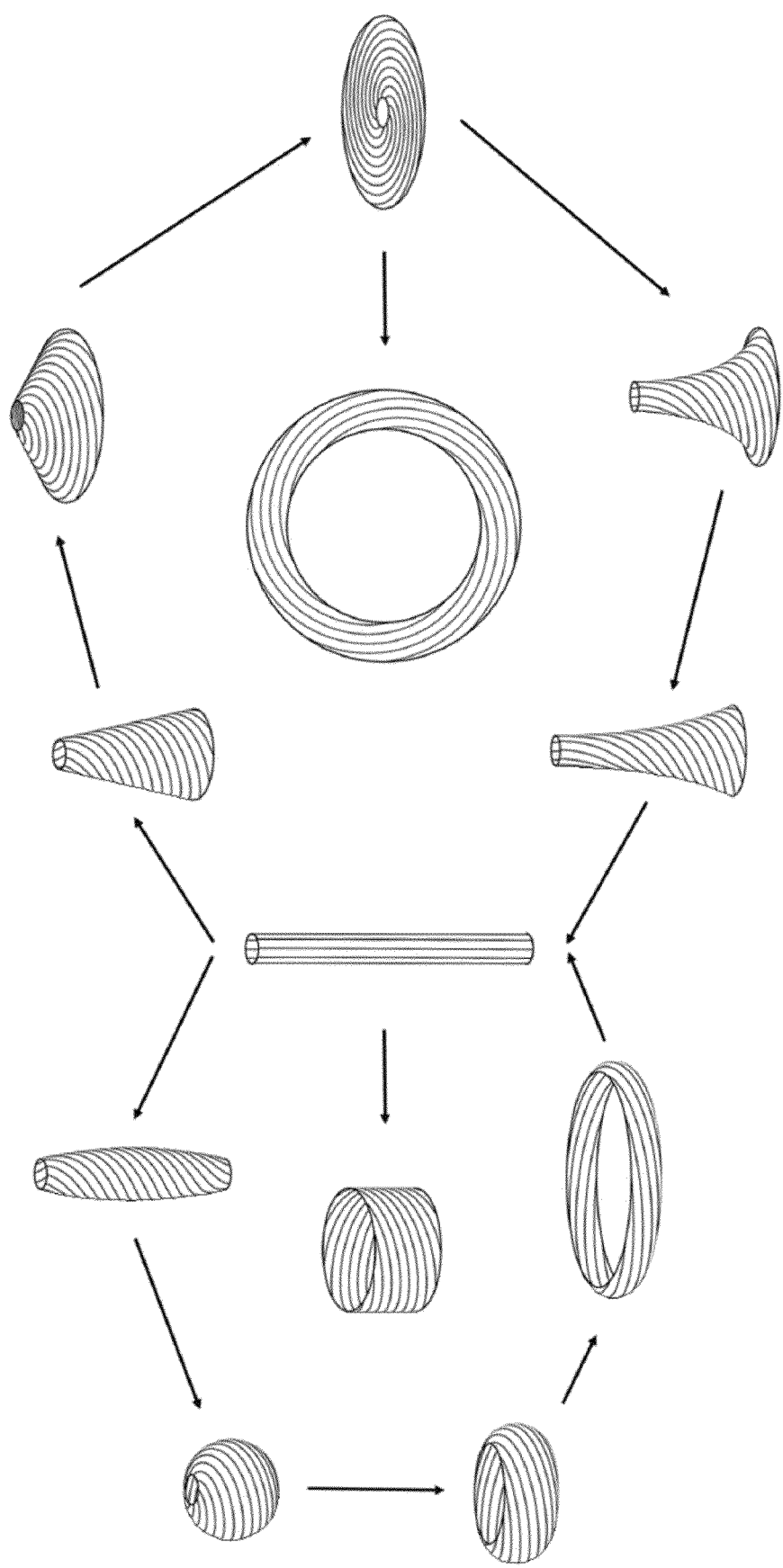
FIG. 10 shows thirteen different examples of shapes obtained from the same tubular morphable sheet structure, all having the same area, including cylinder-shape, cone-shape, disc-shape, trumpet-shape, spindle-shape, sphere-shape and tire-shape.

For example, in FIG. 9B, a morphable sheet structure having a stable trumpet shape is shown. If such sheet structure is collapsed by an external force, once the external force is released the sheet structure will spontaneously expand to recover the stable trumpet-shape.

Said sheet structure can have an additional stable shape for example in the form of a cylinder or can be morphed into the cylindrical shape by external or internal actuators or by the control of the stable shape of the rods, for example using shape-memory rods. This will allow the sheet structure to morph into the trumpet-shape or into the cylindrical shape in a controlled manner, and also will permit the recovery of one of those shapes when the sheet structure has been previously collapsed or modified by an external force.

Figure 11:
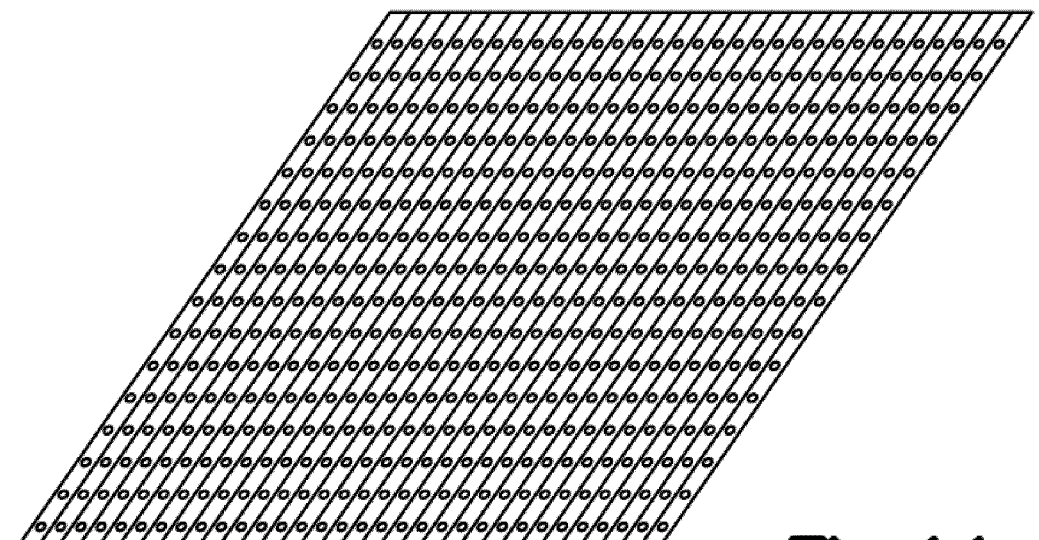
FIG. 11 shows the flat sheet structure shown on FIG. 5 but each rod including holes regularly distributed along its longitude, modifying the flexibility of the resulting rod and generating a porous sheet structure.

It is also proposed that each rod 10 could have one or multiple holes or section reductions along its longitude, modifying the elastic properties and possibly the permeability of the resulting sheet structure. One embodiment of this feature is shown on FIG. 11.

Figure 12:
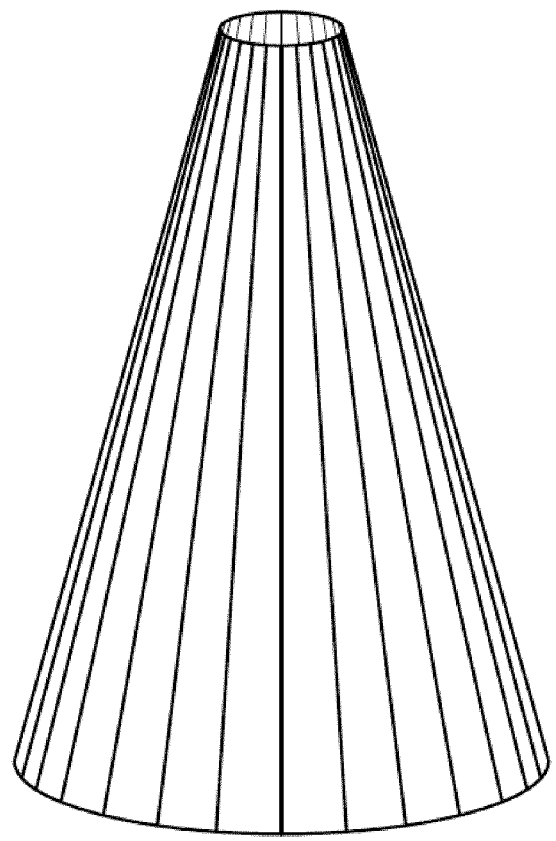
FIG. 12 shows a perspective view of an alternative embodiment in which the width of each rod is constantly increasing along its longitude, producing a truncated conical sheet structure.

It is also proposed that each rod 10 could have a variable width, producing a non-flat or non-cylindrical sheet structure. For example, in FIG. 12 it is shown one embodiment in which the rods 10 have a constantly increasing width, producing a conic sheet structure.

Other alternatives are also contemplated, for example each rod 10 having a variable width with a thickened central region and narrow ends defining a spindle-shaped rod 10 and producing a spindle-shaped or a spherical-shaped sheet structure when assembled.

Also, it is contemplated the rods 10 having a portion with a constant width and having another portion or portions having a narrowing or a thickening of the width, producing a variety of different sheet structures when assembled.

Figure 13:
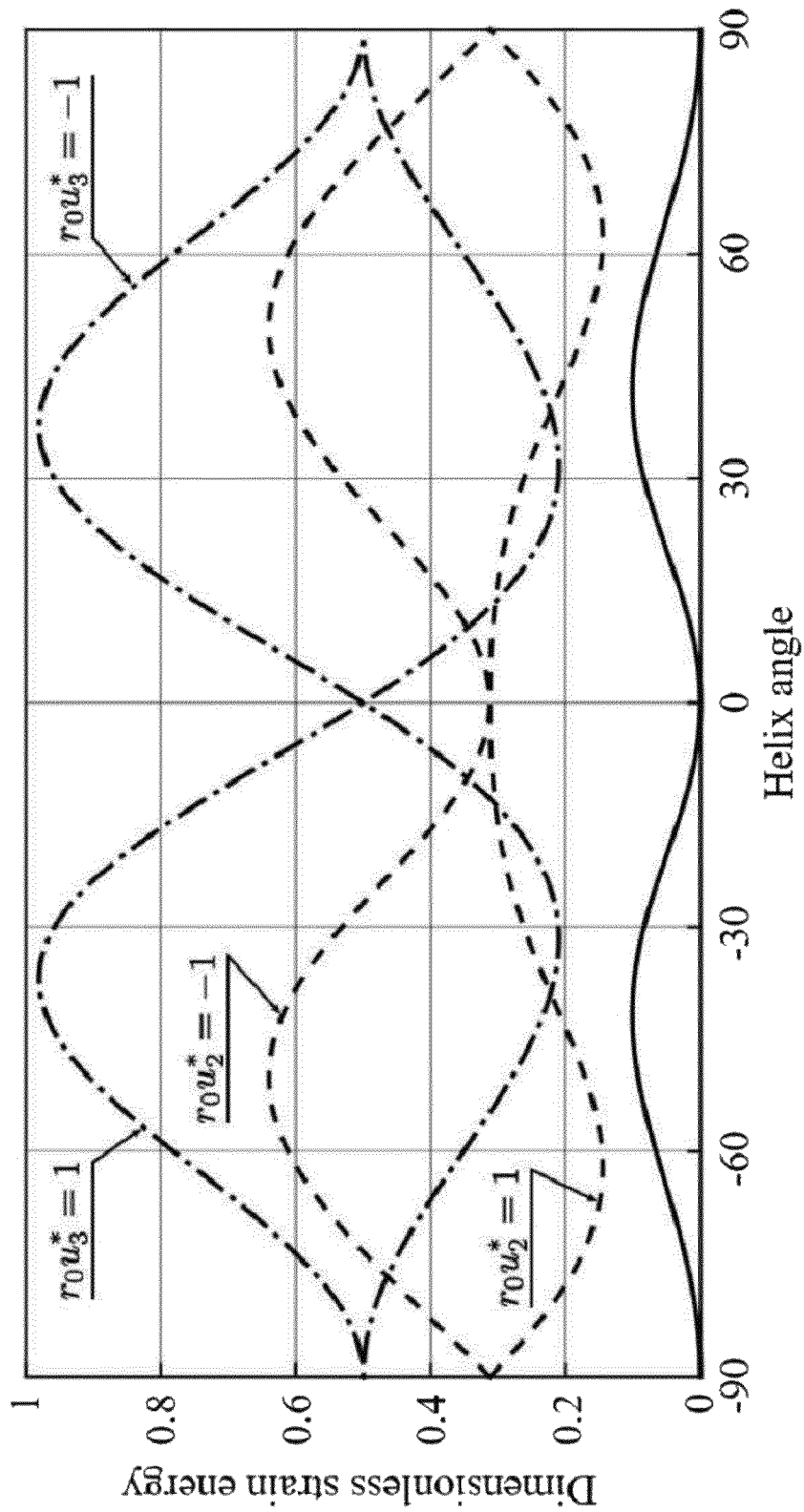
FIG. 13 shown a graph of the stored elastic energy for a cylindrical sheet structure composed of 20 rods as a function of the helix angle (inclination of the rods axis with respect to the cylinder axis).

FIG. 13 shown the elastic energy stored of a cylindrical sheet structure composed of 20 rods as a function of the helix angle (inclination of the rods axis with respect to the cylinder axis), assuming that all rods 10 have the same properties For rods 10 without spontaneous curvature or torsion, the cylindrical sheet structure has two stable low energy states. One in which the rods 10 are straight and the cylinder is long and thin, and one in which the rods 10 are bend, and the cylinder is short and fat.

The energy landscape is modified by the spontaneous curvature and torsion of the rods 10, leading to different equilibrium stable shapes (minima of the elastic energy). Note that the spontaneous torsion breaks the symmetry of the energy landscape.

Theoretical model for the elastic energy (in non-dimensional form) as a function of the helix angle.

$$\varepsilon(\theta)\frac{r_0^2}{n\ell_0 T} \simeq \frac{1}{2}\left[\beta(\sin^2\theta\cos\theta - r_0 u_2^*)^2 + (\sin\theta\cos^2\theta - r_0 u_3^*)^2\right]$$

wherein:

$u_2^*$ is the spontaneous curvature of the rods 10;

$u_3^*$ is the spontaneous torsion of the rods 10;

$\beta$ is the ratio between bending and torsional rigidity of the rods 10;

$r_0$ is the radius of the cylindrical sheet structure with straight rods 10.

Preferably each single rod 10 has a constant width on its entire longitude, but it is also contemplated said width being variable, while the first connector 11 and the second connector 12 do not change along the rod 10.

The use of non-constant width rods 10 will generate a non-flat and non-cylindrical initial sheet structure for example a cone-shape, sphere-shape, spindle-shape structures.

It will be understood that various parts of one embodiment of the invention can be freely combined with parts described in other embodiments, even being said combination not explicitly described, provided there is no harm in such combination.

The invention claimed is:

1. Morphable sheet structure comprising a succession of adjacent flexible elongated rods laterally connected to each other defining a sheet structure, each rod having two ends and defining a longitudinal axis from one end to the other end; the rods are grouped in pairs, and:
   each pair of adjacent rods are connected to each other through a first connector tightly connected to a second connector complementary with the first connector, being the first connector part of one rod of the pair of adjacent rods and being the second connector part of the other rod of the pair of adjacent rods;
   being the first connector and the second connector slidably movable to each other in the direction of the longitudinal axis;
   the first connector and/or the second connector extending along the entire longitude of the rod;
   the flexible elongated rods are bendable or twistable along the longitudinal axis simultaneously with the sliding movement of the relative position between adjacent rods;
   the morphable sheet structure is morphable from a flat or singly curved shape into a doubly curved shape with non-zero Gaussian curvature.

2. The morphable sheet structure according to claim 1, wherein at least some of the rods are:
   driven rods configured to produce driven controlled bending or twisting thereof, and/or
   linked rods linked to each other through an internal actuator configured to produce a relative sliding movement between the linked rods, causing the bending or twisting thereof; and/or
   externally actuated rods connected to an external actuator configured to produce a local movement of parts of the sheet structure, causing deformation of the sheet structure and the bending or twisting of at least some of the rods.

3. The morphable sheet structure according to claim 2, wherein each driven rod, or each internal actuator or each external actuator is made or comprises structures made of a driven material which changes a shape thereof under predefined conditions.

4. The morphable sheet structure according to claim 3, wherein
   the driven material integrated in the driven rods or in the structures attached to the driven rods is configured to change the longitude thereof, bend or twist under predefined conditions and is eccentrically attached to the driven rod, imposing the bending or twisting to the driven rod; or
   the driven material integrated in the driven rods or in the structures attached to the driven rods is configured to change the longitude thereof, bend or twist under predefined conditions and is eccentrically attached to the driven rod, imposing the bending or twisting to the driven rod and at least some of the driven rods comprises structures made of driven material on two opposed sides thereof; or
   the driven material integrated in the internal actuator is configured to change the longitude thereof, bend or twist under predefined conditions and is connected to the linked rods, imposing a sliding movement between the two linked rods; or
   the driven material integrated in the external actuator is configured to change the longitude thereof, bend or twist under predefined conditions and is connected to the externally actuated rods.

5. The morphable sheet structure according to any preceding claim 3 wherein the predefined conditions producing the driven material to change the shape thereof are predefined electrical conditions, and the driven material is connected by wires to a control device configured to provide controlled amounts of electric current to the driven material, producing the controlled shape transformation thereof.

6. The morphable sheet structure according to claim 1 wherein the rods are inextensible and incompressible in a longitudinal direction parallel to the longitudinal axis.

7. The morphable sheet structure according to claim 1 wherein the first connector and the second connector are configured to retain adjacent rods at a constant distance.

8. The morphable sheet structure according to claim 1 wherein the first connector and the second connector are inextensible and incompressible in a transversal direction perpendicular to the longitudinal axis (A).

9. The morphable sheet structure according to claim 1 wherein
   each rod comprises one first connector and one second connector; or
   each rod of a first group of rods comprises two first connectors and each rod of a
   second group of rods comprises two second connectors, being the rods of the first group and the rods of the second group alternated.

10. The morphable sheet structure according to claim 1 wherein the first and/or second connectors are placed on opposed sides of each single rod.

11. The morphable sheet structure according to claim 1 wherein:
    the first connector comprises a channel accessible through a narrowed mouth slot;
    the second connector comprises a flap equal or thinner than the narrowed mouth slot and a thickened end of the flap thicker than the narrowed mouth slot;
    being the flap of each rod tightly fitted on a narrowed mouth slot of an adjacent rod and being the correspondent thickened end inserted into the correspondent channel of the adjacent rod.

12. The morphable sheet structure according to claim 1 wherein at least one rod is elastically bendable in a transversal direction perpendicular to the longitudinal axis, defining a stable shape of the at least one rod and one or a plurality of stable shapes of the sheet structure.

13. The morphable sheet structure according to claim 12 wherein different rods have different stable shapes.

14. The morphable sheet structure according to claim 1 wherein each rod, comprising the first and/or second connectors, is made of a single material.

15. The morphable sheet structure according to claim 1 wherein the sheet structure is a tubular structure.

16. The morphable sheet structure according to claim 1 wherein at least one rod contains a responsive element selected among:
   shape-memory material;
   bimorph piezoelectric element;
   responsive polymer; or
   responsive hydrogel,
   pneumatically inflatable element,
and the material is tuned or controlled to produce a plurality of stable shapes or to modify a stable shape thereof.

17. The morphable sheet structure according to claim 1 wherein an external actuator is connectable to the sheet structure applying forces thereto producing the sliding movement between adjacent rods and the deformation of the sheet structure.

18. The morphable sheet structure according to claim 1 wherein the first connector and the second connector of two adjacent rods are actuatable by an internal actuator producing the relative sliding movement thereof.

19. The morphable sheet structure according to claim 1 wherein:
   each rod has a constant cross section along the longitudinal axis; or
   each rod has a non-constant cross section along the longitudinal axis.

20. The morphable sheet structure according to claim 1 wherein each one of the succession of adjacently disposed and flexible elongated rods comprises a non-constant cross section along the longitudinal axis.

* * * * *